United States Patent [19]
Cromleigh

[11] 3,741,066
[45] June 26, 1973

[54] MUSICAL NOTATION AND ACTUATOR SYSTEM

[76] Inventor: Ralph G. Cromleigh, 4511 Lasheart Drive, La Canada, Calif. 91011

[22] Filed: Mar. 5, 1971

[21] Appl. No.: 121,343

[52] U.S. Cl. .................................. 84/478, 84/423
[51] Int. Cl. ....................................... G09b 15/08
[58] Field of Search ..................... 84/478, 477, 423

[56] References Cited
UNITED STATES PATENTS

| | | | |
|---|---|---|---|
| 3,331,271 | 7/1967 | Glenn .................................. | 84/478 |
| 3,022,698 | 2/1962 | Lucas .................................. | 84/423 |
| 2,221,143 | 4/1940 | Lang .................................... | 84/478 |
| 2,885,921 | 5/1959 | Goldhammer ....................... | 84/423 |

Primary Examiner—Richard B. Wilkinson
Assistant Examiner—Lawrence R. Franklin
Attorney—Jackson & Jones

[57] ABSTRACT

A musical notation and actuator system is disclosed. The notation system includes the use of identical staves which uniquely correspond to octaves. Each of the staves includes three uniformly spaced lines which correspond to particular musical tones. Alphanumeric designators may be used to particularly identify a stave with an octave. Notes superposed on the staves designate tones to be sounded by a musical instrument. Notes are provided with particular shapes to indicate when semi-tones, either higher or lower than the tone defined by the line or space of a stave, are to be sounded. The actuator system is typified by being physically marked to correspond to the lines and spaces of a stave.

8 Claims, 9 Drawing Figures

Patented June 26, 1973

Patented June 26, 1973 3,741,066

INVENTOR.
RALPH G. CROMLEIGH
BY
Jackson & Jones
ATTORNEYS

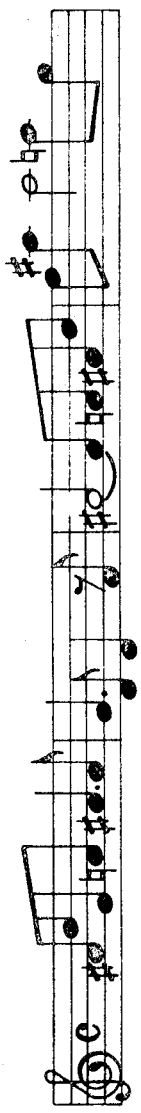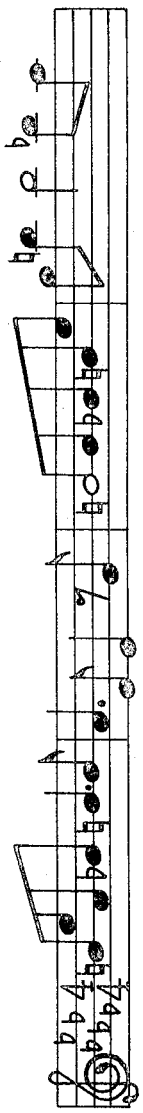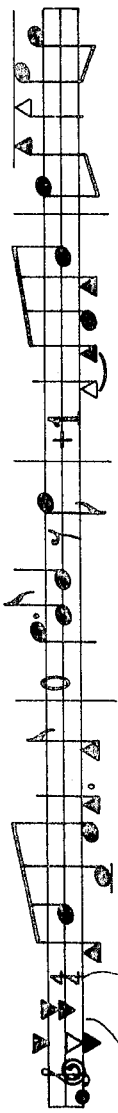

MUSICAL NOTATION AND ACTUATOR SYSTEM

BACKGROUND OF THE INVENTION

1. Field of the Invention

This invention generally relates to a musical notation technique and to a corresponding actuator arrangement. More particularly, the present invention concerns a musical notation system including three-lined staves, the lines and spaces of which correspond to the particular tones in a diatonic scale and which may be readily correlated with the actuators of certain musical instruments, i.e., piano keyboard, to permit a musician to readily sight-read written music.

2. Description of the Prior Art

Many musical notation systems including the use of staves having one or more lines have been heretofore proposed and used. A single line corresponding to a single fixed pitch, and about which neumes were placed in various relations to the single line to indicate varying degrees of higher and lower pitches, was proposed as early as the 10th century. The single line was usually colored red in early Latin parchments and was customarily defined to represent the middle octave tone of f.

A second line was added above the red $f$-line and was colored either yellow or green. This second line was defined to designate the pitch of $c'$. A third line representing the pitch of a was later added to further clarify pitch references. This third line was colored black and was placed between the $f$-line and the $c'$ line. With three lines, each pair of adjacent lines represented a distance of a third instead of a fifth, i.e., between the pitches of $f$ and $c'$.

By the 12th century a fourth line, colored black, was in use. This fourth line was either added above the $c'$-line to designate the pitch of $e'$ or was added below the $f$-line to designate the pitch of $d$. Whether an $e'$-line or a $d$-line was used, generally depended on the range of a plainsong melody to be recorded. Four-lined staves are still used for Roman Catholic liturgical music.

The use of five-lined staves, which is typical of modern musical notation, was started in the 13th century and became the standard by the mid-17th century. Generally, the present day five-lined system was adapted as a standard as a result of the visual convenience that it provided over other proposed notation schemes.

It is to be noted that the development of single and multi-lined staves for musical notation was primarily in contemplation of the pitch range of the human voice and melodies typified by chants and plainsongs which very rarely exceed an octave in range. The later use of more than five lines was prompted by the need for instrumental scores.

Using a modern piano as an example, music written for pianists ordinarily includes a pair of staves which are connected with a brace. The staves generally correspond to the right and left hands of a pianist and are uniquely marked with a treble or bass clef. The upper stave is for the right hand and is usually marked with a treble clef while the lower stave is for the left hand and may be marked with a bass clef or a treble clef. Any pitch that is higher or lower than those pitches represented by the lines and spaces of a stave are accommodated by ledger lines that are stacked above the treble stave or extend below the bass stave. Each of these ledger lines, and the intervening spaces, designate a particular pitch of the diatonic scale, as do the respective lines and spaces of the stave.

Generally, a bass stave and a treble stave will combine to cover approximately three octaves in a non-repetitive manner. The use of ledger lines and superscript symbols can extend the coverage to eight octaves when necessary. Considering that there are seven tones in a diatonic scale, eight octaves would involve 56 different pitches, each of which is designated by a different position on a modern five-lined stave. There is no redundancy of tone positions when a treble stave and a bass stave are used as the pitches designated by the included lines and spaces having corresponding positions in these staves are different and must be learned for each stave.

It is readily apparent that writing the seven notes in a diatonic scale in a non-repetitive notation scheme, while perhaps easier to read than the notation schemes used in the 11th through 13th centuries, nevertheless does not permit a musician to readily translate the written music to identify particular actuators of a musical instrument, i.e., the keys of a piano, which are to be mechanically operated. This difficulty naturally prohibit untutored persons from reading the music and playing an instrument such as the piano.

Accordingly, it is the intention of the present invention to provide a musical notation system which may be easily sight-read and which allows untutored persons to quickly learn to recognize written notes. It is a further intention of the present invention to provide a musical notation system that may be readily correlated with a variety of musical instrument actuator schemes, such as keyboards of pianos or the holes of harmonicas, to allow a neophyte musician to play the instrument. It is a yet further intention of the present invention to provide an instrument actuator system which is correlated with the musical notation system to facilitate the actuators being manipulated by a musician in accordance with written music.

SUMMARY OF THE INVENTION

Briefly described, the present invention involves a musical notation system that permits written music to be readily sight-read and translated to mechanical movement of particular actuators on an instrument to provide a desired sound having a selected tone. The invention also involves an instrument actuator system which is particularly correlated with the staves used in the notation system.

More particularly, the subject musical notation system includes a combination of symbols that are used to uniquely designate pitches that may be played on a musical instrument, or sung. Staves having three parallel lines defining two interior spaces and two exterior spaces are used to designate the seven tones of a diatonic scale. An alphanumeric symbol placed at the leading end of a stave associates that stave, or a portion thereof, with a particular octave such that the lines and spaces of the stave represent a particular pitch. Semitones are designated by unique note shapes. Conventional key signature techniques are used.

The correlated keyboard includes the use of keys that are marked to correspond to the lines and spaces of the staves. The repetitious markings may be visually distinctive as well as distinctive to touch. The visual markings may be accomplished with a pair of different colors, or the like, one color for lines and another color for spaces. The touch markings may be accomplished with a difference in texture or finish.

The objects and many attendant advantages of the invention will be more readily appreciated as the same becomes better understood by reference to the following detailed description which is to be considered in connection with the accompanying drawings wherein like reference symbols designate like parts throughout the figures thereof.

DESCRIPTION OF THE DRAWINGS

FIGS. 6a and 6b are graphic diagrams illustrating music written in the key of c using a conventional five-lined stave and a three-lined stave, in accordance with the invention, respectively.

FIGS. 7a and 7b are graphic diagrams illustrating music written in the key of d-flat using a conventional five-lined stave and a three-lined stave, in accordance with the present invention, respectively.

DESCRIPTION OF THE PREFERRED EMBODIMENT

Figure 1:
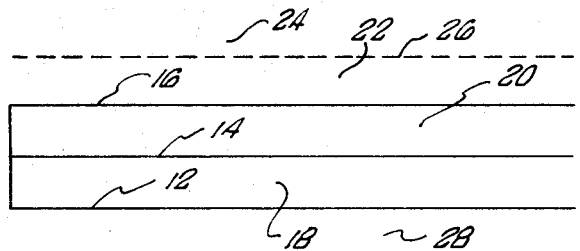
FIG. 1 is a graphic diagram illustrating a three-lined stave in accordance with the present invention.

Referring now to FIG. 1 of the drawings, a musical notation scheme, in accordance with the present invention, involves the use of a stave 10 formed with three uniformly spaced lines 12, 14 and 16 which define a pair of interior spaces 18 and 20. Also defined by the line 16 are a pair of spaces 22 and 24 which may be pictured as being separated by an imaginary line. A broken line 26 graphically illustrates such an imaginary line. When considered in terms of a series of juxtaposed staves, the space 24 will be understood to represent the same tone as a space 28 positioned below the line 12. The pitches of the spaces 24 and 28, however, will differ by an octave, the pitch of space 24 being higher.

Considered with respect to the seven tones in a diatonic scale, the succession of lines and spaces defined by a stave may designate the diatonic tones as shown in TABLE I hereinbelow.

TABLE I

| Stave Format | Diatonic Scale in Pitch Names |
|---|---|
| line 12 | do |
| space 18 | re |
| line 14 | mi |
| space 20 | fa |
| line 16 | so |
| space 22 | la |
| space 24 | si |

It is apparent that since each of the seven tones of a diatonic scale are accommodated by a stave, particular pitches in different octaves may be simply accommodated by using more than one stave.

Figure 2:
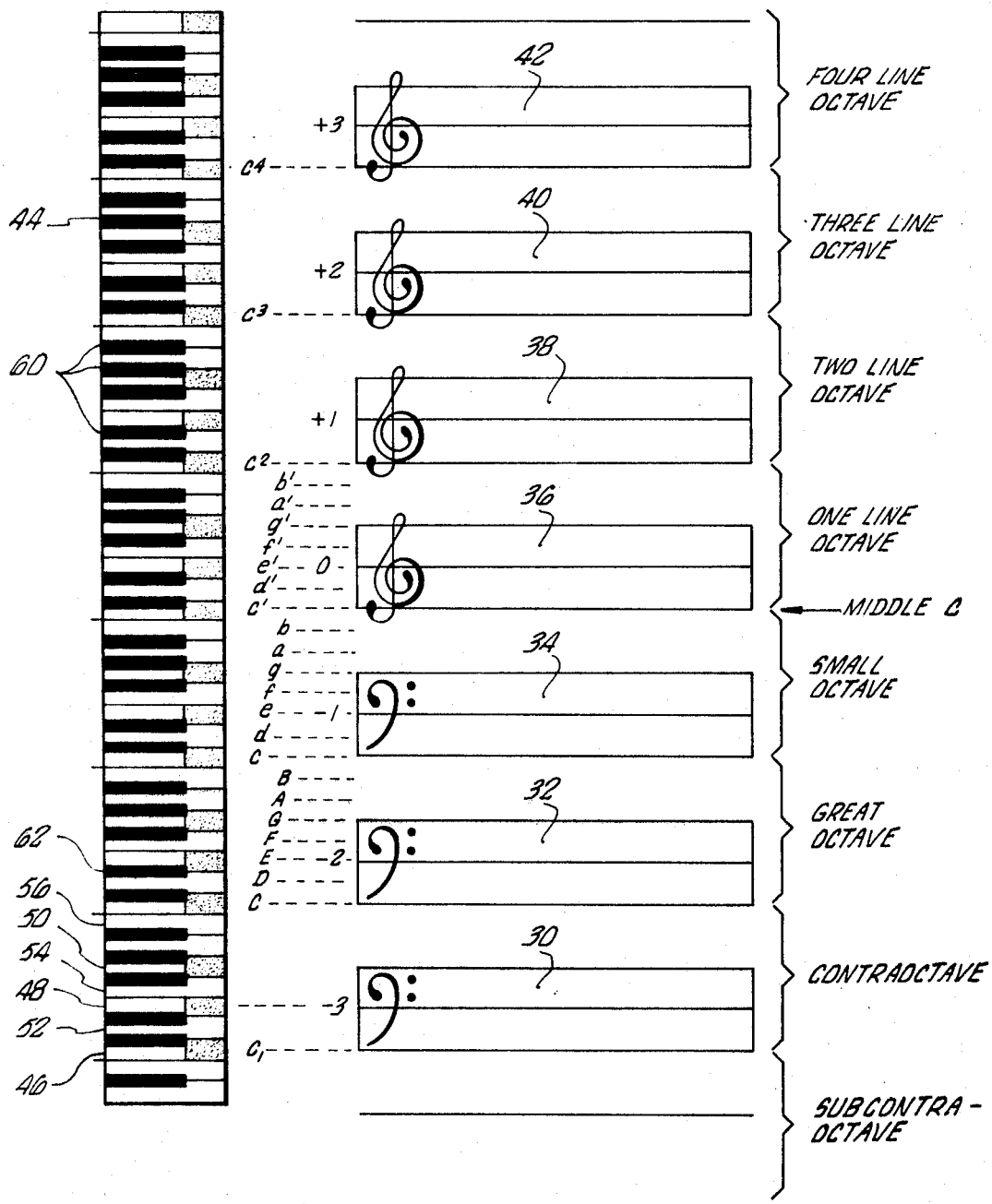
FIG. 2 is a graphic diagram illustrating a sequence of staves corresponding to approximately seven consecutive octaves and a correlated piano keyboard in accordance with the invention.

As shown in FIG. 2, a total of seven staves 30, 32, 34, 36, 38, 40 and 42 will serve to substantially cover the different pitches for which keys or actuators are provided on a piano keyboard. The terms "actuators" and "keys" are intended as alternate terms herein. A piano is used as an example in that it is understood to be the one modern musical instrument having a range in excess of seven octaves and which range is not exceeded by any other instrument.

With reference to the piano keyboard 44, shown in FIG. 2, staves may be labelled or otherwise marked to correspond to preselected octaves. For example, a stave corresponding to the "one line" octave including the pitches of $c'$, $d'$, $e'$, $f'$, $g'$, , $b'$ may be labelled with an octave designator "O" placed at the forefront of the stave. Higher and lower octaves may be designated by increasing positive f'E, F, numbers preceded with a plus sign (+) and decreasing negative numbers preceded with a negative sign (−). TABLE II hereinbelow summarizes the octave designators and corresponding scales shown in FIG. 2.

TABLE II

| octave designator | octave name | diatonic scale |
|---|---|---|
| +3 | four line octave | $c^4, d^4, e^4, f^4, g^4, a^4, b^4$ |
| +2 | three line octave | $c^3, d^3, e^3, f^3, g^3, a^3, b^3$ |
| +1 | two line octave | $c^2, d^2, e^2, f^2, g^2, a^2, b^2$ |
| 0 | one line octave | $c^1, d^1, e^1, f^1, g^1, b^1$ |
| −1 | small octave | $c, d, e, f, g, a, b$ |
| −2 | great octave | $C, D, G, A, B$ |
| −3 | contraoctave | $C_1, D_1, E_1, F_1, G_1, A_1, B_1$ |

It is to be understood that any other sequence of designators which serve to uniquely relate the staves with particular octaves may be used.

In any musical notation system, it is necessary to have the lines and spaces of staves represent particular tones. Since octaves traditionally start with the tone of C and proceed higher, it is convenient to have the lowermost line of the stave represent the tone of C and progress higher. This scheme is summarized in TABLE III hereinbelow with reference to FIG. 1.

TABLE III

| | Contra octave | Great octave | Small octave | One line octave | Two line octave | Three line octave | Four line octave |
|---|---|---|---|---|---|---|---|
| Space 24 | $B_1$ | B | b | $b^1$ | $b^2$ | $b^3$ | $b^4$ |
| Space 22 | $A_1$ | A | a | $a^1$ | $a^2$ | $a^3$ | $a^4$ |
| Line 16 | $G_1$ | G | g | $g^1$ | $g^2$ | $g^3$ | $g^4$ |
| Space 20 | $F_1$ | F | f | $f^1$ | $f^2$ | $f^3$ | $f^4$ |
| Line 14 | $E_1$ | E | e | $e^1$ | $e^2$ | $e^3$ | $e^4$ |
| Space 18 | $D_1$ | D | d | $d^1$ | $d^2$ | $d^3$ | $d^4$ |
| Line 12 | $C_1$ | C | c | $c^1$ | $c^2$ | $c^3$ | $c^4$ |

For the purposes of having the staves of the present invention cover the individual octaves in a repetitive fashion, it is recognized that the lines and spaces of the stave could be arbitrarily designated in some order other than that shown in TABLE III. And this is actually the case when a stave is employed, as an example, for writing musical scores intended to be vocalized. In such a case, the line 12 is consistently used for the diatonic pitch *do* which may correspond to any of the tones C D E F G A or B, or some chromatic alteration thereof, when vocalized.

Having the lowermost line 12 of a stave designate the tone of C also provides the advantage of having the conventional white keys of a piano keyboard readily brought into correspondence with the lines and spaces of the staves. This is accomplished by having these conventional white keys or actuators marked to have the white keys corresponding to lines darkened and the white keys corresponding to spaces left white. As shown in FIG. 2, the actuator 46 for the tone of C is darkened. Similarly, the alternate succeeding keys or actuators 48 and 50, which respectively correspond to the actuators for the tones of E and G, are darkened. Alternate actuators 52, 54 and 56, respectively corresponding to the tones of D, F and A, are left white as is the actuator 58 for the tone of B. The conventional black keys or actuators 60 of a piano keyboard are left unaltered. As may be observed from the keyboard 44 of FIG. 2, when successive white keys or actuators are marked in the sequence above described, and as summarized in TABLE IV hereinbelow, the pattern of darkened actuators is repetitive and corresponds to the dark and light pattern formed by a stave, i.e., dark, light, dark, light, dark, light, light.

TABLE IV

| Marking Sequence | Actuator Tone | Stave Format |
|---|---|---|
| Light | B | space (24) |
| Light | A | space (22) |
| Dark | G | line (16) |
| Light | F | space (20) |
| Dark | E | line (14) |
| Light | D | space (18) |
| Dark | C | line (12) |

Whatever the tones designated by the lines may be, corresponding white piano keys or actuators are marked to match the line/space sequence of a stave. Any means of darkening may be used, i.e., paint, ink, tape, etc., to alter the appearance of a portion, or all, of an actuator. In addition, or as an alternative to changing the appearance of keys or actuators, the keys to be darkened may be provided with surfaces that are distinguishable when touched. This may be simply done by changing the surface texture or finish of the keys that would be darkened. Any means available in the prior art may be used.

It is to be understood that the correlation marking technique above discussed in connection with a piano keyboard, due to its range, is applicable to any other instrument having a similar configuration of actuators, i.e., accordian, glocken-spiel, xylophone, harpsichord, vibraphone, etc. Considered more generally, the subject actuator marking technique is applicable to any configuration of actuators wherein the specific actuators corresponding to diatonic tones are distinguishable from actuators corresponding to the chromatic alterations.

Figure 3:
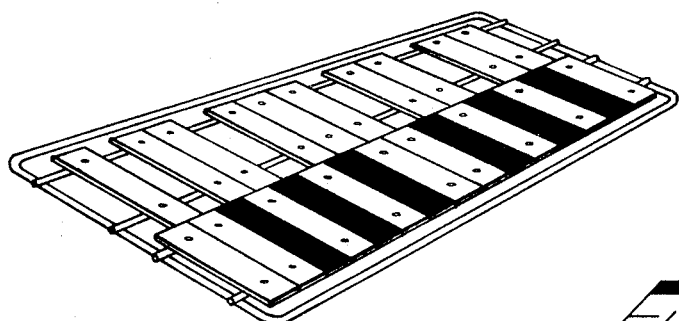
FIG. 3 is a schematic diagram illustrating a glockenspiel having the bars thereof correlated to staves in accordance with the present invention.

FIG. 3 illustrates how the lower row of bars of a glockenspiel may be marked for correlation.

Again referring to FIG. 2, each of the staves may be provided with either a bass clef or a treble clef. In that alphanumeric octave designators are used, the traditional treble and bass clefs serve no particular function except to generally bring the subject notation system into comparable correspondence with the modern standard notation scheme. Such relation to standard musical notation may be of particular assistance to musicians long trained to read modern standard musical notation. It is noted, however, that totally unknowledgable, neophyte musicians and well trained musicians have exhibited a comparable ability to rapidly comprehend and sight-translate music written with the subject musical notation scheme.

Figure 4:
FIG. 4 is a graphic diagram illustrating the manner in which a pair of staves may be connected and used to accommodate a written melody ranging over two octaves.

FIG. 4 illustrates how musical notes for a melody ranging over more than one octave is written on three-lined staves in accordance with the present invention. The standard timing notation scheme is retained, i.e., the intended duration of notes is signified by the coloring of the notes, the presence of a stem, and the number of flags of the stem, etc. As an alternative to the use of multiple staves, particularly in instances where the melody infrequently exceeds the range of one octave, ledger lines corresponding to the lines of an adjacent stave may be used. Another alternate would be to simply insert an octave designator after a "bar line" as shown in FIG. 6b wherein an octave designator of "0" has been inserted after a bar line 64 to indicate that the following notes are intended to refer to tones in the "one line" octave (see TABLE II). Should it be necessary, additional octave designators may be used to indicate further octave changes such as has been done in the stave illustrated by FIG. 6b wherein an octave designator "+1" has been written after a bar line 66 to indicate that succeeding notes refer to tones in the "two-line" octave.

A musical notation scheme to be useful, must allow for chromatic alterations to notes or tones of the diatonic scale. Such chromatic alterations, i.e., sharps and flats, serve to produce the succession of 12 semitones forming a chromatic scale and are usually symbolized by "#" for sharps and "♭" for flats. A sharp or flat placed before a note signifies that the note is to be raised or lowered by a half tone, respectively. In that notes are related to the key signature and may thus be raised or lowered by a half tone according to the key signature and when not otherwise preceded by a sharp or a flat, a natural sign "♮" is used in standard notation to cancel, or neutralize, an alteration directed by the key signature.

Figure 5:
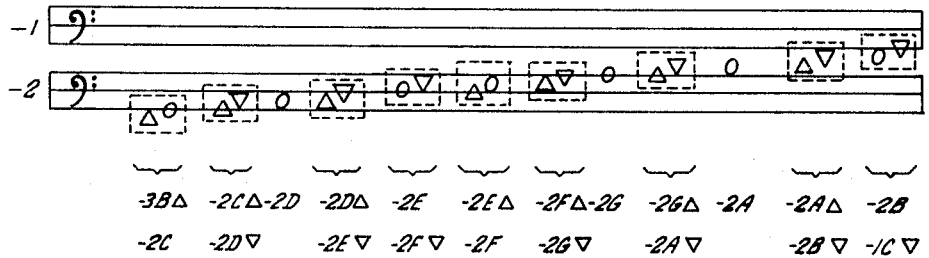
FIG. 5 is a graphic diagram illustrating a plurality of shaped notes superposed on three-lined staves in a sequence of a chromatic scale.

The subject musical notation system employs note shapes to indicate chromatic changes. Specifically, the conventional round note refers to the pitch defined by the line or space of the stave on which the round note is placed. A triangular note with the point thereof directed upwardly generally serves the function of a sharp and indicates that a similarly placed round note is to be altered a half tone higher. A triangular note with the point thereof directed downwardly generally serves the function of a flat and indicates that a similarly placed round note is to be altered a half tone lower. FIG. 5 illustrates how a chromatic scale in the great octave could be written in the musical notation of the present invention. The pairs of notes in boxes formed with dashed lines, are equivalent to each other and serve as alternates that may be used to refer to the same pitch. For example, the notes labelled "−2D△" and "−2E▽" refer to the same pitch of D-sharp or E- flat by alternate names. As is well known, this pitch may be sounded on a piano by operation of the conventional black actuator 62 (see FIG. 2). Each of the notes in FIG. 5 have been identified by octave designator, i.e., −2, −1, etc., diatonic tone, i.e., D, E, etc., and alternation, i.e., △,▽, if any. Such a method of identification is merely one convenient manner of literally referring to particular pitches instead of using the symbology, i.e., staves, notes, etc., of a musical notation system.

FIGS. 6a and 6b serve to provide a comparative illustration of written music using the standard five-lined stave and the three-lined stave of the present invention. As may be observed from FIG. 6b, the use of triangular shaped notes, to indicate desired chromatic alterations, makes the use of standard symbology ("accidentals") unnecessary. The written music thus obtains the appearance of being less crowded.

As earlier mentioned, the standard scheme of timing notation is retained. The use of standard time signatures as well as key signatures are also retained. However, triangles are used in the key signature, as shown in FIG. 7b, in place of the standard accidentals used in the key signature shown in FIG. 7a. Specifically, solid triangles are used in place of the usual sharps and flats forming the key signature, in accordance with the present invention. To save a musician the trouble of memorizing the different keys for which the different number of sharps or flats stand, a non-solid note, in the form of either a triangle (FIG. 7a) or unaltered round note (FIG. 6b), is used to indicate the key in which the music is written. As shown in FIG. 6b, the key signature includes an unaltered non-solid note which is situated on the C line between the treble staff and the time signature and which indicates that the musical score is written in the key of C. In FIG. 7b, the key signature includes a non-solid, downwardly directed triangle which is situated on the D space as a part thereof and which indicates that the musical score is written in the key of D-flat (D▽).

As earlier described, the tones to which the respective lines and spaces refer must be fixed in order that a musical notation system be universally readable and thereby gain public acceptance. Nevertheless it is sometimes helpful, particularly with unaccompanied vocal renditions of music, to have the lines and spaces of staves simply be defined by the pitch names *do, re, mi,* etc. In such case, for the sake of uniformity, the lowermost line 12, (see FIG. 1) as earlier explained, designates *do,* the following space 18 designates *re,* the next line 14 designates *mi,* etc. If it is necessary, for whatever reason, to correlate *do* with a particular one of the tones C, D, E, F, etc., then this may simply be accomplished by the employment of a "tuning mark." Such tuning marks take the form of a round or triangular note (whichever is appropriate), which is placed on a line or space of the stave before the treble or bass clef. In FIGS. 6b and 7b, the tuning mark indicates that the lowermost line 12 designates the tone of C. Had the tuning mark appeared as a round mark placed on the uppermost line 16 (FIG. 1) then it would be understood that the lowermost line 12 and *do* would correspond to the tone of G. As a further example, if the tuning mark in FIG. 7b had been placed on the middle line 14, the lowermost line and *do* would correspond to the tone of E. A standard key signature of D-flat would then effectively produce a scale in the key of F. This complex flexibility is necessary particularly for the convenience of musicians playing instruments tuned to keys other than the key of C. The same complexity exists with present day music except that the presently standard notation system affords no way of particularly indicating the key to which an instrument may be tuned and for which the music is written.

From the foregoing discussion it is not apparent that the present invention provides a new musical rotation system and a correlated actuator system for keyboard-type musical instruments which permit written music to be readily sight-read, with a minimum of repetitions and disciplined musical training, for the purpose of translating such written music.

While a preferred embodiment of the invention has been described hereinabove, it is intended that all matter contained in the foregoing description and shown in the accompanying drawings be interpreted as illustrative and not in a limiting sense and that all modifications, constructions, and arrangements which fall within the scope and spirit of the present invention may be made.

What is claimed is:

1. An actuator system for a musical instrument of the type having a multiplicity of key-type devices arranged in juxtaposed alignment as actuators, said actuators in succession cyclically representing the tones of a C scale diatonic sequence in successive octaves, said actuators being marked in a repetitive pattern covering successive groups of seven adjacent actuators for said successive octaves, said pattern corresponding to the lines and spaces defined by a stave having three uniformly spaced lines and presenting a spatial pattern of Line-space-line-space-line-space-space for each said successive octave.

2. The apparatus defined by claim 1 wherein said repetitive pattern is formed with two distinctive markings, a first marking representing lines of said stave and a second marking representing spaces of said stave, said first marking being applied to the first, third and fifth actuators of each of said groups of seven adjacent actuators considered in an order of increasing pitch, said second marking being applied to the second, fourth, sixth and seventh actuators.

3. The apparatus defined by claim 2 wherein said first markings are applied to actuators corresponding to the tones of C, E, and G.

4. An actuator system, for a musical instrument of the keyboard type, including actuators arranged in a lower layer and an upper layer, said actuators being arranged in an order representing musical tones of progressively higher frequency with the actuator representing the tone of lowest frequency at a first end of said keyboard and the actuator representing the tone of highest frequency at a second end of said keyboard, successive groups of seven actuators of said lower layer representing successive octaves of a diatonic sequence of tones said actuators having markers in a repetitive pattern of first and second markings, said pattern of markers correlating the actuators to the lines and spaces of a stave formed by three parallel lines presenting an ascending spatial pattern of line-space-line-space-line-space-space, the successive lines and spaces of said spatial pattern respectively representing the seven different tones included in an octave of said diatonic sequence, wherein for each group of seven actuators three of said actuators have said first markings corresponding to said lines of said spatial pattern, and four of said actuators have said second markings corresponding to said spaces of said spatial pattern.

5. The apparatus defined by claim 4 wherein said first marking when applied to said group of seven successive actuators of said lower layer in a direction of increasing tone being applied to the first, third and fifth actuators, said second marking appearing on the second, fourth, sixth and seventh actuators.

6. The apparatus defined by claim 5 wherein said first markings are applied to actuators corresponding to the musical tones of C, E, and G.

7. The apparatus defined by claim 5 wherein said markings are distinctive in appearance.

8. The apparatus defined by claim 5 wherein said markings are distinguishable by touch.

* * * * *